United States Patent [19]

Gerhardt

[11] Patent Number: 4,741,498
[45] Date of Patent: May 3, 1988

[54] ULTRASONIC DRAG REDUCTION AND LIFT INCREASE

[75] Inventor: Heinz A. A. Gerhardt, Redondo Beach, Calif.

[73] Assignee: Northrop Corporation, Hawthorne, Calif.

[21] Appl. No.: 906,359

[22] Filed: Sep. 11, 1986

[51] Int. Cl.$^4$ ............................................. B64C 23/00
[52] U.S. Cl. ................................. 244/130; 244/204; 244/198
[58] Field of Search .............. 244/198, 200, 207, 204, 244/203, 130; 415/DIG. 1; 138/40; 114/67 R, 67 A

[56] References Cited

U.S. PATENT DOCUMENTS

| | | | |
|---|---|---|---|
| 2,366,162 | 1/1945 | Vang | 114/67 R |
| 3,362,663 | 1/1968 | Wehrmann | 244/130 |
| 3,972,383 | 8/1976 | Green | 244/207 |
| 4,516,747 | 5/1985 | Lurz | 244/130 |

Primary Examiner—Galen Barefoot
Attorney, Agent, or Firm—Terry J. Anderson; Robert B. Block

[57] ABSTRACT

Method and apparatus for reducing aerodynamic drag and enhancing lift by using ultrasound to alter the structure of boundary layers. In one embodiment, a continuous thin sheet of ultrasound is radiated transversely into the boundary layer parallel to an aerodynamic surface, such as an aircraft wing, carrying that boundary layer.

To ensure that the ultrasound sheet remains under (or over) the wing, means are provided to compensate for any downstream drift of the sheet with wing flow by transmitting it in a forward direction in proportion to the Mach number of the flow. The ultrasonic sheet may be applied as periodic strips spaced at predetermined downstream intervals.

In order to decrease the amount of acoustical energy required to implement the techniques of the present invention and to operate in a more efficient manner, the ultrasound transmission is modulated with audio frequencies.

Means for tuning the audio frequency to match various flight conditions are provided.

26 Claims, 2 Drawing Sheets

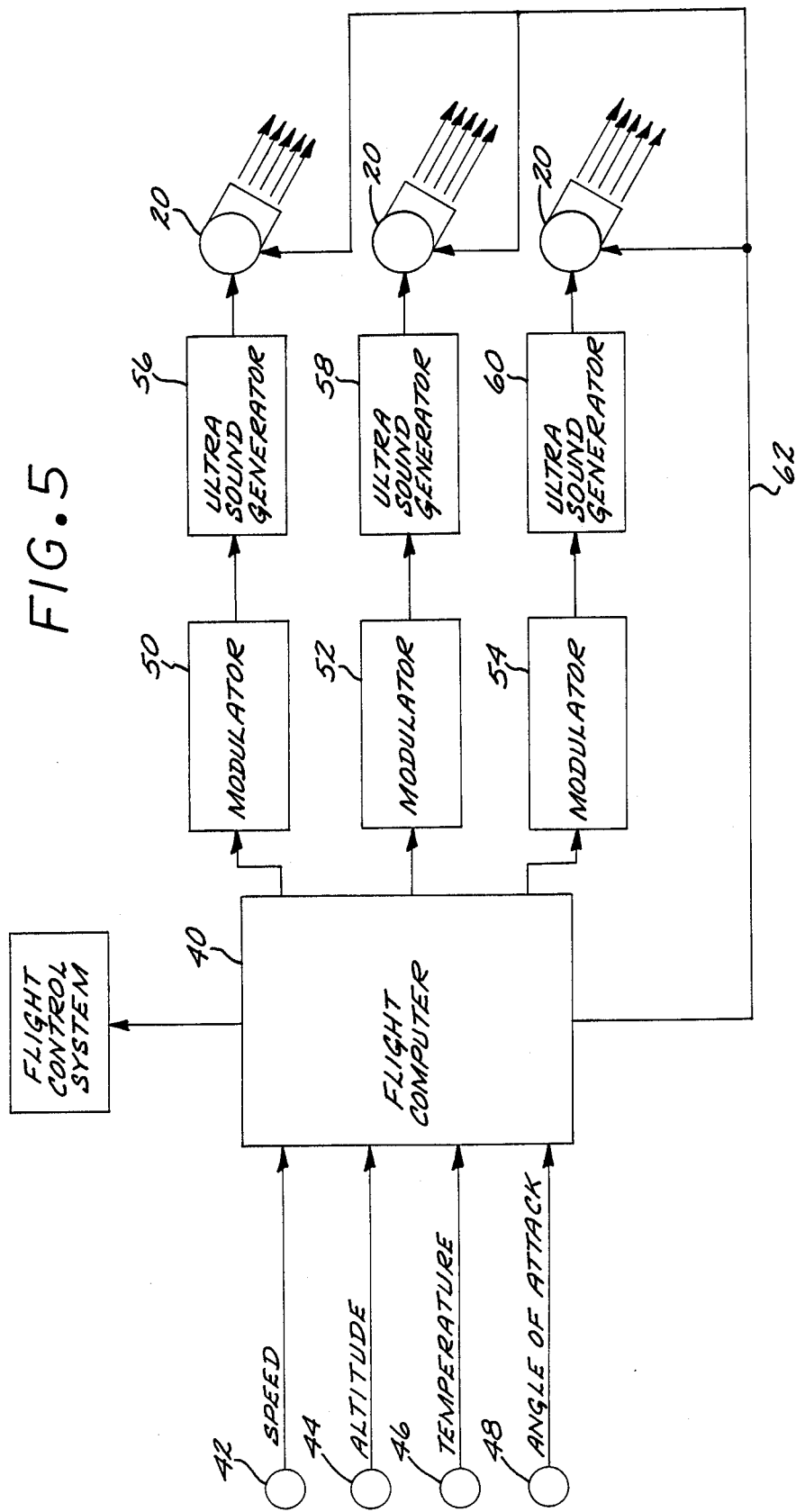

ULTRASONIC DRAG REDUCTION AND LIFT INCREASE

BACKGROUND OF THE INVENTION

1. Field of the Invention

The present invention relates to the use of acoustic energy to both decrease drag and increase lift on an aerodynamic body such as the wing of an aircraft by controlling the turbulence structure of the fluid boundary layers.

2. Description of the Prior Art

Fluids such as air moving past a body or inside ducts form so-called boundary layers on the surfaces of the bodies or ducts. Within these relatively thin boundary layers the fluid velocity increases from zero at the surface to full stream velocity at the edge of the boundary layer. In most technical applications, particularly in the aeronautical field, such boundary layers are turbulent. Turbulence in boundary layers consists of micro-scale flow features such as eddies which form and decay in seemingly random fashion. As a result, discrete fluid particles move not only in the mean stream direction but also fluctuate perpendicular to that direction. The perpendicular fluctuations increase the mixing between the flow within the boundary layer and the full stream flow adjacent to it.

The exchange of fluid between the two flow regimes increases the skin friction drag, but it also energizes the boundary layer so that it becomes less susceptible to separation which can cause a loss in lift. Thus a turbulence decrease will lead to lower drag, an increase to higher lift.

It has been demonstrated experimentally that acoustic energy in the audible frequency range can either increase or decrease turbulence in a boundary layer. A turbulence increase occurs when the acoustic frequency is in resonance with the characteristic frequency of the fluctuating fluid particles in the boundary layer. Conversely, acoustic waves of non-matching frequency tend to dampen the turbulence. As noted hereinabove, a turbulence increase makes the boundary layer less susceptible to flow separation and therefore results in a lift increase. A turbulence decrease is associated with a reduction in skin friction and therefore results in a decrease in drag.

Difficulties arise in the focused injection of acoustic energy into the boundary layer because of the dispersed radiation characteristics of audible sound.

Concepts of using acoustic energy to decrease drag or increase lift on an aerodynamic body, such as the wing of an aircraft, have been disclosed in the prior art. For example, U.S. Pat. No. 4,516,747 to Lurz discloses a method for controlling the boundary layer of flow over the surface of a body by introducing controlled mechanically induced vibrations in the boundary layer by utilizing sensors and a closed loop control system. U.S. Pat. No. 3,362,663 to Wehrmann discloses a system wherein a compliant wall surface is disposed within the path of a flowing fluid and attached to a solid surface. Mechanical vibrations are transmitted into the boundary layer by using sensors to energize the wall surface in a feedback control system. U.S. Pat. No. 3,774,867 to Quinn discloses a system for recovering lift on a stalled airfoil by acoustically exciting the region of stalled flow using cavity resonators as the sound source. U.S. Pat. No. 2,783,008 to Bodine discloses a system for controlling the shock wave generated by an airfoil by attenuating the high frequency component of the shock wave. Attenuation is provided by using a sound absorber or a sound generator. U.S. Pat. No. 3,972,383 to Green discloses a sound absorption lining in which its acoustic resistance is varied by an oscillatory air pressure signal applied thereto, the lining being disposed in a duct of an air propulsor. U.S. Pat. No. 2,853,852 to Bodine discloses a system for controlling the boundary layer within an aerodynamic duct by using either of sound absorber or a sound generator.

Although the various techniques described hereinabove disclose various techniques for altering the structure of aerodynamic boundary layers to achieve a drag reduction, each of the techniques disclosed have various drawbacks associated therewith. For example, the systems disclosed tend to be overly complex and expensive to implement. Further, those systems using audible acoustic energy to reduce drag must provide high intensity sound levels due to the poor directional properties of audible sound and the low rates of absorption into the boundary layer flow. The random injection of vibrational energy, particularly acoustic energy, without a specific directional characteristic limits the effectiveness of the disclosed drag reduction techniques. Further, no effort has been made to match the acoustic waves to the dynamic structure (spatial and characteristic frequency) of the turbulent boundary, the lack of such a match again reducing the effectiveness of the prior art techniques. Finally, the prior art techniques do not combine drag reduction and lift increase in one system.

SUMMARY OF THE PRESENT INVENTION

The present invention provides a technique for reducing aerodynamic skin friction drag on an airvehicle and enhancing lift by using high frequency ultrasound to control the structure of boundary layers, ultrasound being easily focused in comparison to audible sound. A thin sheet of ultrasound is radiated edgewise (transversely) into the boundary layer substantially parallel to the surface carrying that boundary layer. The ultrasonic sheet may be generated from transducers mounted in the sides of the airvehicle or by radiating ultrasound inboard from transducers mounted in the wing tip pods of the airvehicle.

To ensure that the ultrasound sheet remains over (or under) the wing of the airvehicle, means are provided to compensate for any downstream drift of the sheet with wing flow by transmitting it in a forward direction in proportion to the Mach number of the flow.

The ultrasonic sheet may be applied in a continuous manner over the entire surface, although for practical reasons it is preferable to apply the sheet as periodic strips spaced at predetermined downstream intervals.

In order to decrease the amount of acoustic energy required to implement the techniques of the present invention and to operate in a more efficient manner, the ultrasound transmission is modulated with audio frequencies (the high frequency ultrasound being the carrier for the active audible low frequency signal). Means for tuning the audio frequency to match frequency requirements for either drag reduction or lift increase are provided. These frequencies, in turn, are a function of aircraft flight speed and altitude.

The present invention thus provides a technique for reducing aerodynamic skin friction drag and enhance lift of an airvehicle by injecting acoustic energy transversely into the wing boundary layer, the acoustic energy comprising ultrasound modulated with audio frequencies.

The present invention takes advantage of certain unique properties and advantages associated with ultrasound. In particular, ultrasonic acoustic energy can be readily focused, or directed, at its intended point of interaction thus requiring a less powerful (and thus less expensive) sound generator than previously required. A further advantage of using ultrasound modulated with audible sound as opposed to using audible sound by itself is the relative ease of generating very large sound intensities (oscillating air pressure signals) with small sized sound transducers. Further, since the rate of absorption of acoustic energy into the boundary flow increases with increasing frequency, ultrasound further decreases the acoustic energy required.

The frequency of ultrasound typically does not match the characteristic frequency of the turbulent boundary layer although the wavelength of ultrasound matches the length dimensions of the turbulence structure in the boundary layer. This latter spatial match will enhance the interaction between the acoustic energy and the formation of the boundary layer eddies and smaller scale turbulence features.

Thus, the present invention further provides a technique for substantially matching the spatial and temporal (frequency) characteristics of the transmitted acoustic wave to the dynamic characteristics of the turbulent boundary layer. The spatial match is provided since ultrasonic wave lengths are of the order of millimeters and centimeters, substantially the same as the typical dimensions of the discrete turbulence structure. Because the characteristic frequencies of the turbulent boundary layer are in the audible range, a mismatch normally will occur since the frequency of the spatial acoustic signal is of a single frequency, typically outside the audible range. The present invention, as set forth above, provides a technique for providing the match to maximize the drag reduction feature of the present invention by modulating the ultrasonic transmissions with audible frequencies and by tuning the audio frequency to match various flight conditions, such as the requirement for either lift enhancement or drag reduction, Mach number, Reynolds number, etc.

BRIEF DESCRIPTION OF THE DRAWING

For a better understanding of the invention, as well as further features and objects thereof, reference is made to the following description which is to be read in conjunction with the accompanying drawing wherein:

FIG. 5 is a simplified block diagram representation of the system used to control the acoustic energy transmission in accordance with the teachings of the present invention.

DETAILED DESCRIPTION OF THE INVENTION

Figure 1:
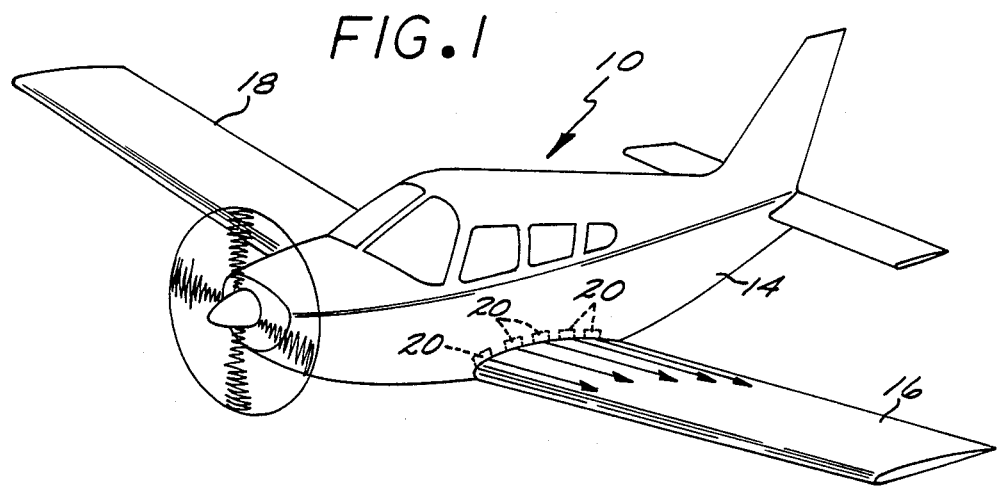
FIG. 1 is a perspective view of an airvehicle utilizing the techniques of the present invention.

Referring now to FIG. 1, a perspective view of an aerodynamic surface in which the principles of the present invention may be utilized is illustrated. In particular, an airvehicle, or aircraft 10, comprises fuselage portion 14 and wings 16 and 18. Although aircraft 10 is illustrated as a small propeller driven type craft, the invention may also be utilized with jet aircraft, such as jet fighters and commercial jet airliners. Since the description that follows is equally applicable to both wings 16 and 18, the invention will only be described in conjunction with the wing 16.

Since the principles of aerodynamic flow are well known and have been briefly discussed hereinabove, the description that follows will not repeat this material for the sake of brevity. The present invention capitalizes on certain unique properties and advantages associated with ultrasound (frequency greater than 20 Khz). In particular, the invention utilizes the excellent directional characteristics of ultrasound to direct or focus the generated acoustic energy into the fluid boundary layer contiguous to the wing surface thus controlling the turbulence structure of the layer and thus controlling drag reduction and lift increase. In particular, the generated acoustic energy is radiated edgewise as a thin sheet of ultrasound into the boundary layer parallel to the wing surfaces which carry the boundary layer. The ultrasonic radiation penetrates the boundary layer all the way to the wing tip and from there spill over into space. However, in its path through the boundary layer a major portion of its acoustic energy is absorbed in controlling the turbulence structure.

Figure 2:
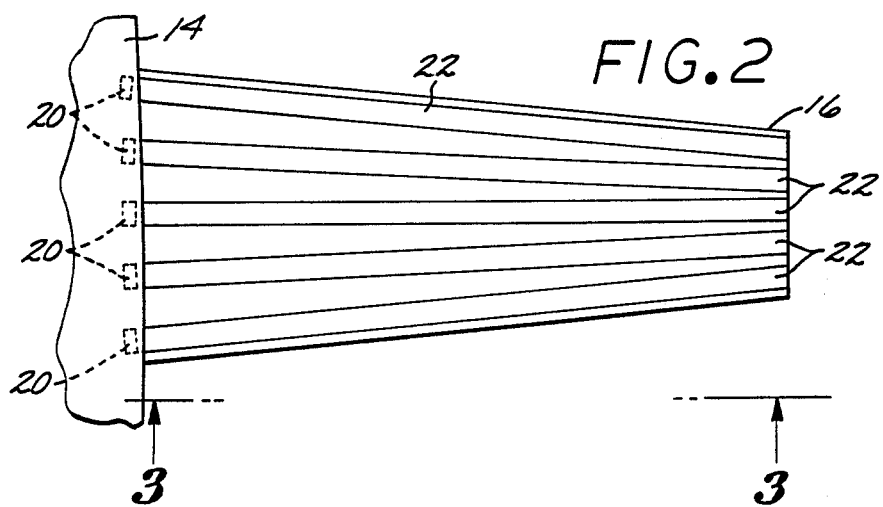
FIG. 2 is a plan view of the wing portion of the airvehicle shown in FIG. 1.
Figure 3:
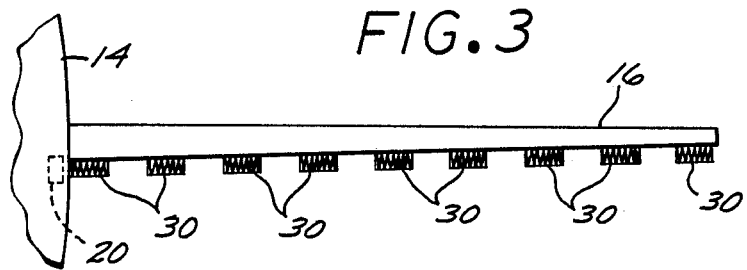
FIG. 3 is a sectional view along line 3—3 of FIG. 2 illustrating the movement of acoustic waves along the wing length.

In this regard, a plurality of ultrasound transducers 20 (five illustrated in FIGS. 1 and 2 although the number can be greater or smaller) are positioned at the wing root 21 along the width of the wing chord. The transducers 20 are installed on the side of fuselage 14 and are preferably designed to radiate a sound in the spanwise direction in the form of thin strips 22 periodically spaced in the chordwise direction. The height of the acoustic sheets injected into the boundary layer carried by the wing surface preferably is the same as the height of the boundary layer itself. The boundary layer is typically a thin layer of approximately 0.1 inches at the foward wing position and increases in height to approximately 2 to 3 inches at the trailing edge of wing 16. The height of the transducers 20 can be designed to follow the boundary layer profile. For economic reasons this may be impractical, and the transducers are preferably designed such that they are the same size and thus transmit periodic sheets of approximately the same height. In that case, the height of the sheets generated by the transducers 20 are preferably equal to the average height of the boundary layer on the wing surface. FIG. 3 is a sectional view illustrating packets of modulated ultrasound acoustic energy 30 traveling along the length of wing 16.

Figure 4:
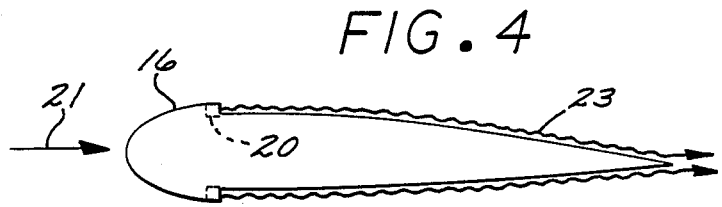
FIG. 4 is a sectional view illustrating an alternative location of the acoustic transducers.

The ultrasound alternately can be radiated inwardly from transmitters mounted in the wing tip pods (not shown), from transmitters mounted both on the wing tip pods and on the fuselage or in a chordwise direction (same direction as the free stream) as illustrated in the sectional view shown in FIG. 4.

As has been set forth hereinabove, drag reductions and lift increases using external sources of audible sound have been previously demonstrated. Depending on frequency, a boundary layer turbulence decrease (drag reduction) or turbulence increase (delay of flow separation which corresponds to higher lift), can be achieved using acoustic energy.

It has been determined that in order to be most effective, the acoustic waves generated should be matched to the dynamics of the turbulent boundary layer. In this regard, a spatial match exists using ultrasound since ultrasonic wave lengths are of the order of millimeters and centimeters, the same as the typical dimensions of the discrete turbulence structure. However, a mismatch exists in the frequency domain in that characteristic frequencies of the turbulent boundary layer are in the audible range. In accordance to the teachings of the present invention, this problem is resolved by modulating the ultrasound transmission with audible frequencies. Three different methods of modulating the ultrasound with the low frequency audio signal may be utilized in the present invention (the principle of utilizing a high frequency carrier wave modulated with a low frequency signal is conventionally applied in telecommunications, especially in broadcasting):

(1) Amplitude modulation, wherein the ultrasonic sound pressure amplitude is varied in proportion to a separately generated audible sound wave of desired frequency;

(2) Pulsation, wherein a stream of constant amplitude discrete ultrasonic pulses are generated at a rate corresponding to the desired audio frequency (shown in FIG. 3); or (3) Beat generation, wherein two ultrasonic waves are produced in close physical proximity to each other and which differ in frequency by an amount equal to the desired audio frequency. Through superposition and attendant cancellation and amplifications a single ultrasonic wave results which is similar to the one produced through amplitude modulation.

These modulation methods are conventional in ultrasonic signalling systems.

The apparatus utilized to generate the ultrasound and to modulate the ultrasound is also conventional and readily available. The conventional transducers are modified in shape to radiate ultrasound in strips 22 (or a single sheet), the modified transducers corresponding to tranducers 20.

The optimum audio frequencies for drag decrease and lift increase are dependent on flight condition, i.e. they are a function of aircraft speed, altitude and local Reynolds Number. As shown in FIG. 5, that information is received by flight computer 40 from various sensors 42, 44 ... 48 on the aircraft. The flight computer 40 uses that information together with empirical data to calculate optimum audio frequencies and provides this information to modulators 52, 54 and 56 (only three modulators shown for purposes of clarity although the number of modulators utilized typically equal the member of transducers 20 shown in FIGS. 1 and 2) for modulation control. The output of modulators 50, 52 and 54 are coupled to ultrasound generators 56, 58 and 60, respectively, which generate an electrical signal corresponding to the desired audio modulated ultrasound wave. The output of generators 56, 58 and 60 are coupled to acoustic transducers 20 which in turn produce the modulated ultrasonic rays.

Flight computer 40 also controls the emission direction of the ultrasonic rays and the acoustic power output of the transducers via lead 62, thus ensuring that the generated ultrasonic sheets or strips remain under (or over) the wing, computer 40 providing the means to compensate for the downstream drift of the sheet with the wing flow by transmitting the sheet in a forward direction in proportion to the air speed of the aircraft (which in turn is proportional to the Mach number of the flow). The transducers 20 may thus be mounted on a rotable device such that the sound waves can be directed at an angle dependent upon the air speed as shown in FIG. 2 by controlling transducers 20 by computer 40. The direction angle of sound wave injection can be varied to correspond to aircraft speed by a signal from flight computer 40 as noted hereinabove.

Although in the preferred embodiment the ultrasonic sheet is generated as periodic strips spaced at predetermined downstream intervals, a single continuous sound sheet having the width of a wing chord may be utilized instead.

The present invention thus improves on prior art drag reductions and lift increase systems by using ultrasound. The excellent directional characteristics of ultrasound allows the acoustic energy to be focused at its intended point of action, thus making the system of the present invention more efficient than prior art systems. An additional advantage of utilizing ultrasound when compared to audible sound is in the ease of generating very large sound intensities with small sized equipment thus reducing the weight and costs associated with currently available systems. Further, since the rate of absorption of acoustic energy into the flow increases with increasing frequency, a further decrease in required acoustic energy occurs when ultrasound is utilized.

The application of the above described ultrasonic boundary layer control is not restricted to aircraft wings. It can be applied to lifting surfaces moving in water or in any other fluid. Furthermore, the techniques of the present invention can be used to reduce drag for any body moving through a fluid. Lastly, the present invention can be used to minimize pressure losses of a fluid moving inside a pipe or duct.

While the invention has been described with reference to its preferred embodiments, it should be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. Apparatus for controlling the turbulence of a fluid boundary layer contiguous to the surface of an air vehicle comprising:
    means for operating an ultrasonic sound wave of a first frequency;
    means for amplitude modulating said ultrasonic sound wave with an acoustic sound signal of a second frequency to produce a modulated sound wave; and
    means for radiating said modulated sound wave into said boundary layer.

2. The apparatus of claim 1 wherein said modulated wave is in the form of a thin sheet substantially parallel to said surface.

3. The apparatus of claim 2 wherein said sheet is substantially continuous.

4. The apparatus of claim 2 wherein said sheet comprises periodic strips over said surface spaced at predetermined intervals.

5. The apparatus of claim 1 wherein said second frequency is adjusted to correspond to the desired drag reduction on said body.

6. The apparatus of claim 1 wherein said second frequency is adjusted to correspond to the desired lift enhancement on said body.

7. The apparatus of claim 1 wherein said modulation means comprises means for generating a stream of constant amplitude ultrasonic pulses at a rate corresponding to said audio frequency.

8. A method for controlling the turbulence of a fluid boundary layer contiguous to the surface of an air vehicle comprising the steps of:
generating an ultrasonic sound wave of a first frequency;
amplitude modulating an ultrasonic sound wave of a first frequency with an acoustic signal of a second frequency to produce a modulated sound wave; and
radiating said modulated sound wave into said boundary layer.

9. The method of claim 8 wherein said modulated energy wave is in the form of a thin sheet.

10. The method of claim 9 wherein said thin sheet is substantially parallel to said surface.

11. The method of claim 10 wherein said sheet is substantially continuous.

12. The method of claim 11 wherein said sheet comprises periodic strips over said surface spaced at predetermined intervals.

13. The method of claim 8 wherein said second frequency is adjusted to correspond to the desired drag reduction on said body.

14. The method of claim 8 wherein said second frequency is adjusted to correspond to the desired lift enhancement on said body.

15. Apparatus for controlling the turbulence and onset of separation flow characteristics of a fluid flow stream boundary layer passing the surface of an air vehicle, said stream boundary layer having a variation in flow characteristics across its thickness with variations longitudinally along the flow path, at least a portion of said boundary layer containing low energy fluid as said flow separates from said flow surface, comprising:
means for generating ultrasound at frequencies greater than approximately 20 Khz;
means for modulating said ultrasound to produce intensity variations therein at audio frequencies; and
means for radiating said modulated wave of ultrasound along a path directed tangentially on the surface and along said boundary layer to provide a source of ultrasonic vibration energy within said boundary layer having an intensity varying at an audio rate to inhibit flow separation resulting from said low energy fluid where flow separates from said flow surface.

16. The apparatus as in claim 15 further in which said means for modulating said ultrasonic wave includes means for varying the ultrasonic wave intensity at an audio frequency.

17. The apparatus as in claim 15 wherein said means for modulating said ultrasonic wave includes means for generating discreet pulses of said ultrasonic waves at an pulse rate less than about 20 KHz.

18. The apparatus as in claim 15 wherein said means for modulating said ultrasonic wave includes means for generating another continuous ultrasonic wave at a frequency which interferes with the first ultrasonic wave at an audio frequency rate to produce an audio frequency beat therewith.

19. The apparatus as in claim 15 further including
means for sensing flow separation characteristics in said boundary layer; and
means for varying the frequency of said transducer means and said carrier wave frequency generating means in response to said sensed flow separation (to vary same thing).

20. The apparatus as in claim 15 further including means for controlling the emission direction of the ultrasonic vibrations to compensate for downstream drift of the vibrations with respect to the speed of movement of said body.

21. A method for controlling the turbulence and onset of separation flow characteristics of a fluid flow stream boundary layer passing the surface of an air vehicle, said stream boundary layer having a variation in flow characteristics across its thickness with variations longitudinally along the flow path, at least a portion of said boundary layer containing low energy fluid as said flow separates from said flow surface, comprising:
generating ultrasound at frequencies greater than approximately 20 Khz;
modulating said ultrasound to produce intensity variations therein at audio frequencies; and
radiating said modulated wave of ultrasound along a path directed tangentially on the surface and along said boundary layer to provide a source of ultrasonic vibration energy within said boundary layer having an intensity varying at an audio rate to inhibit flow separation resulting from said low energy fluid where flow separates from said flow surface.

22. The method as in claim 21 further in which said step for modulating said ultrasonic wave includes varying the ultrasonic wave intensity at an audio frequency.

23. The method as in claim 21 wherein said modulating step includes generating discreet pulses of said ultrasonic waves at an pulse rate less than about 20 KHz.

24. The method as in claim 21 wherein said modulating step includes generating another continuous ultrasonic wave at a frequency which interferes with the first ultrasonic wave at an audio frequency rate to produce an audio frequency beat therewith.

25. The method as in claim 21 further including sensing flow separation characteristics in said boundary layer; and
varying the frequency of said transducer means and said carrier wave frequency generating means in response to said sensed flow separation.

26. The method as in claim 21 further including the step of controlling the emission direction of the ultrasonic vibrations to compensate for downstream drift of the vibrations with respect to the speed of movement of said body.

* * * * *